United States Patent
Kato et al.

(10) Patent No.: US 6,643,680 B1
(45) Date of Patent: Nov. 4, 2003

(54) SIGNAL PROCESSING SYSTEM WHICH CAN REDUCE BURDEN APPLIED TO A CPU OR A SIGNAL PROCESSOR

(75) Inventors: Miki Kato, Tokyo (JP); Emi Kakisada, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 09/084,011

(22) Filed: May 26, 1998

(30) Foreign Application Priority Data

May 26, 1997 (JP) .............................. 9-134679

(51) Int. Cl.[7] .................................................. G06F 9/00
(52) U.S. Cl. ..................................................... 709/104
(58) Field of Search ................................ 709/104, 100, 709/102, 310–332; 711/200–221

(56) References Cited

U.S. PATENT DOCUMENTS

| | | | | |
|---|---|---|---|---|
| 5,479,606 A | * | 12/1995 | Gray ........................... | 345/501 |
| 5,758,129 A | * | 5/1998 | Gray ........................... | 345/523 |
| 5,805,827 A | * | 9/1998 | Chau et al. .................. | 709/247 |
| 5,815,686 A | * | 9/1998 | Earl et al. ..................... | 703/26 |
| 5,893,166 A | * | 4/1999 | Frank et al. ................ | 711/163 |
| 6,006,314 A | * | 12/1999 | Suzuki ........................ | 711/217 |
| 6,021,408 A | * | 2/2000 | Ledain et al. ................... | 707/8 |

FOREIGN PATENT DOCUMENTS

JP          06-282446          10/1994

* cited by examiner

*Primary Examiner*—St. John Courtenay, III
*Assistant Examiner*—Van H. Nguyen
(74) *Attorney, Agent, or Firm*—Foley & Lardner (57) ABSTRACT

In a signal processing system, a plurality of mutually different applications are simultaneously executed. In the system, combinations of applications are predetermined as application patterns according to a given condition, and a processing operation for each application pattern is stored on a table as an operation pattern. Upon an occurrence of change in combination, the operation pattern is determined by referring to the table so that calculation burden in the system can be reduced.

14 Claims, 8 Drawing Sheets

| No. | MODEM | AUDIO DATA COMPRESSION/ DECOMPRESSION | AUDIO EQUALIZER | IMAGE DATA COMPRESSION/ DECOMPRESSION | TOTAL MEMORY SIZE | MEMORY TYPE |
|---|---|---|---|---|---|---|
| 1 | V.34 | ADPCM | PEQ | JPEG | 60 | A, B, C |
| 2 | V.34 | ADPCM | PEQ | MPEG | 80 | B, C |
| 3 | V.34 | ADPCM | GEQ | JPEG | 70 | A |
| 4 | V.34 | ADPCM | GEQ | MPEG | 90 | B |
| 5 | V.34 | MPEG-A | PEQ | JPEG | 80 | A, B, C |
| 6 | V.34 | MPEG-A | PEQ | MPEG | 100 | C |
| 7 | V.34 | MPEG-A | GEQ | JPEG | 90 | A |
| 8 | V.34 | MPEG-A | GEQ | MPEG | 110 | NG |
| 9 | V.32 | ADPCM | PEQ | JPEG | 50 | A, B, C, D |
| 10 | V.32 | ADPCM | PEQ | MPEG | 70 | B, C, D |
| 11 | V.32 | ADPCM | GEQ | JPEG | 60 | A, B, D |
| 12 | V.32 | ADPCM | GEQ | MPEG | 80 | B, D |
| 13 | V.32 | MPEG-A | PEQ | JPEG | 70 | A, C, D |
| 14 | V.32 | MPEG-A | PEQ | MPEG | 90 | C, D |
| 15 | V.32 | MPEG-A | GEQ | JPEG | 80 | A, B, D |
| 16 | V.32 | MPEG-A | GEQ | MPEG | 100 | D |

FIG.3

| APPLICATION TYPE | APPLICATION NAME | TYPE A | TYPE B | TYPE C | TYPE D | MEMORY SIZE |
|---|---|---|---|---|---|---|
| MODEM | V.32 | 0-10 | => | => | => | 10 |
| | V.34 | 0-20 | => | => | X | 20 |
| AUDIO DATA COMPRESSION/ DECOMPRESSION | ADPCM | 20-30 | => | => | => | 10 |
| | MPEG AUDIO | 20-50 | X | 20-50 | 10-40 | 30 |
| AUDIO EQUALIZER | PEQ | 50-55 | => | => | => | 5 |
| | GEQ | 55-70 | 40-55 | X | 40-55 | 15 |
| IMAGE DATA COMPRESSION/ DECOMPRESSION | JPEG | 70-95 | => | => | => | 25 |
| | MPEG | X | 55-100 | => | => | 45 |

FIG. 4

| MAP PATTERN A | MAP PATTERN B | MAP PATTERN C | MAP PATTERN D |
|---|---|---|---|
| V.34 | V.34 | V.34 | V.32 |
| OR V.32 | OR V.32 | OR V.32 | MPEG AUDIO |
| ADPCM OR MPEG AUDIO | ADPCM | ADPCM OR MPEG AUDIO | OR ADPCM |
| | GEQ | | GEQ |
| PEQ | OR PEQ | PEQ | OR PEQ |
| OR GEQ | MPEG | MPEG | MPEG |
| JPEG | OR JPEG | OR JPEG | OR JPEG |
| REMAINDER | | | |

SET MEMORY MAP PATTERN C WHEN GEQ IS NOT EXECUTED, SET MEMORY MAP PATTERN B WHEN MPEG AUDIO IS NOT EXECUTED, AND SET MEMORY MAP PATTERN D WHEN V.34 IS NOT EXECUTED. IF GEQ, MPEG AUDIO AND V.34 ARE ALL EXECUTED, ERROR MASSAGE IS OUTPUTTED TO GIVE GUIDANCE TO CHANGE ANY OF THEM.  ~Se1

TO START

ACCORDING TO FIG.4, SET MEMORY AREA OF 0-10 WHEN V.32, 0-20 WHEN V.34, 20-30 WHEN ADPCM, 50-55 WHEN PEQ, AND 70-95 WHEN JPEG.  ~Sf1

TO START

FIG. 12

SIGNAL PROCESSING SYSTEM WHICH CAN REDUCE BURDEN APPLIED TO A CPU OR A SIGNAL PROCESSOR

BACKGROUND OF THE INVENTION

The present invention relates to an information processing system including a central processing unit (CPU) and a signal processor and, in particular, to a signal processing system including a signal processor which simultaneously processes a plurality of mutually different application programs (hereinafter referred to as "applications") under the control of a CPU.

Signal processing systems of this type have been available, wherein, in general, a signal processor (DSP, RISC) for executing applications of communications, image processing, data collection, etc. is combined with a CPU (microcomputer etc.). Following the increasing processing capabilities of signal processors such as DSPs, such signal processing systems in which a plurality of applications are combined and simultaneously executed have been proposed and actually put to practical use. For example, the signal processing system includes a signal processor which combines an application for modem, an application for compression/decompression of audio signals, an application for audio equalizer and an application for image code, and processes them simultaneously. In such a signal processing system, a variety of user's requests for sounds, images and communications can be satisfied through the simultaneous processing of them.

In the foregoing signal processing systems, for ensuring real-time signal processing, it is necessary to manage the maximum signal processing capability (MIPS) of the signal processor, memory relocation therein and the like by the CPU or the signal processor having the high processing speed.

For explaining it in more detail, operations in a conventional signal processing system including a CPU and a signal processor will be explained. In this case, stored programs in the CPU are divided into an application program interface (API) section defining user's programs, that is, applications, and a combination of them, and a driver section for driving the signal processor.

The driver section executes applications of the signal processor and derives memory locations etc. so as to control programs on the side of the signal processor. More specifically, the driver section sends resource requests of the respective applications to be executed in the signal processor to the signal processor and, when a plurality of applications are executed in a combined fashion, the driver section refers to execution order scheduling information and a table representing the current state of the signal processor so as to carry out processes for the optimum scheduling and memory allocation, and so on. After these processes, the driver section controls a memory and ports of the signal processor, thereby to control the signal processor so as to satisfy requests from the API section.

On the other hand, the signal processor carries out, based on commands from the driver section, scheduling of a plurality of applications and memory allocation therefor so as to achieve real-time signal processing.

However, in the foregoing signal processing system wherein the plurality of applications are simultaneously processed, every time there raises an entry request or a de-entry request from an application, a combination of the applications is changed. Therefore, the CPU or the signal processor should perform processes, such as calculation of resources, scheduling adjustment and memory allocation, depending on the combination of the applications. Since these processes are carried out every time a combination of the applications changes, burden is large for the CPU or the signal processor. Further, this also prolongs time required for designing the whole signal processing system, thereby to cause an increase in cost.

More specifically, applications to be processed in the signal processing system of this type include, in general, applications for modem, applications for audio signal compression/decompression, applications for audio equalizer, applications for image code, and so on. Accordingly, combinations of the applications should be diversified and, as a result, the foregoing processes, such as the calculation of resources, the scheduling adjustment and the memory allocation, to be executed in the CPU or the signal processor become complicated.

SUMMARY OF THE INVENTION

It is therefore an object of the present invention to provide a signal processing system which can reduce burden applied to a CPU or a signal processor.

It is another object of the present invention to provide a signal processing system which can largely shorten time required for designing it and further contribute to reduction in cost.

It is still another object of the present invention to provide a signal processing system which can deal with a variety of combinations of applications.

Other objects of the present invention will become clear as the description proceeds.

According to one aspect of the present invention, there is provided a signal processing, system which comprises A table storing a plurality of pattern data corresponding to a plurality of combinations, respectively, each of which is of applications different from one another and is determined in accordance with a given condition, obtaining means connected to said table for obtaining, as an obtained datum, one of said pattern data with reference to said table in response to a request relating to the use of said applications, and executing means connected to said table and said obtaining means for simultaneously executing said applications in accordance with said obtained datum.

According to another aspect of the present invention, there is provided a signal processing system in which a plurality of mutually different applications are simultaneously executed. The signal processing system comprises a table storing a plurality of pattern data each representing a processing operation corresponding to each of combinations of the applications. The combinations are predetermined in accordance with a given condition. The signal processing system further comprises obtaining means connected to said table and responsive to a request of a change of the applications for obtaining the pattern datum corresponding to the combination of changed applications from said table and means connected to said obtaining means for carrying out the processing operation in accordance with the obtained pattern datum.

According to another aspect of the present invention, there is provided a signal processing method which comprises the steps of storing, on a table, a plurality of pattern data corresponding to a plurality of combinations, respectively, each of which is of applications different from one another and is determined in accordance with a given condition, obtaining, as an obtained datum, one of said pattern data with reference to said table in response to a request relating to a choice of said combinations, and simultaneously executing said applications in accordance with said obtained datum.

DESCRIPTION OF THE PREFERRED EMBODIMENT

Now, a signal processing system according to the present invention will be described with reference to the drawings.

Figure 1:
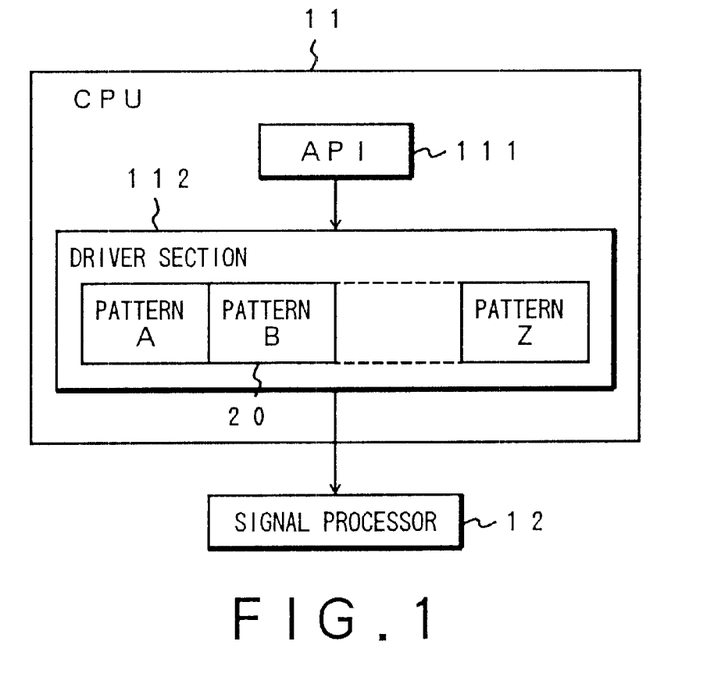
FIG. 1 is a block diagram for explaining the principle of a signal processing system according to the present invention.

Referring to FIG. 1, the principle of the signal processing system according to the present invention will be explained. The shown signal processing system comprises a CPU 11 and a signal processor 12. The CPU 11 has stored programs featured by an application program interface (API) section 111 defining user's programs, that is, applications, and a driver section 112 for controlling the signal processor 12. The API 111 is provided with a plurality of applications corresponding to each of communications, sounds and images. By simultaneously executing applications selected therefrom and combined with each other, a processing operation desired by a user can be accomplished.

The driver section 112 is provided with a table 20 having a plurality of patterns each representing, as pattern information or a pattern datum, a scheduling operation determining an execution order of a plurality of applications and/or a memory allocating operation determining locations on a data memory in the signal processor 12. Those patterns are predetermined based on the maximum processing capability (MIPS) of the signal processor 12, the capacity of the data memory in the signal processor 12, and the simultaneous executability or the concurrency of the applications to be executed. Specifically, the table 20 has patterns A to Z selectable depending on a combination of the applications concerning the communications, sounds and images, and each pattern univocally determines a scheduling operation and/or a memory allocating operation as pattern information or a pattern data.

With this arrangement, when an entry request or a de-entry request of an application is made from the API section 111 to cause a change in combination of the applications, the driver section 112 determines whether an entry or a de-entry of the application is possible with the currently selected pattern and, if possible, sends an entry command or a de-entry command to the signal processor 12. On the other hand, if not possible, the driver section 112 searches the table 20 to select a pattern corresponding to a new combination of the applications and sends pattern information corresponding to the selected pattern to the signal processor 12.

Since the pattern information univocally designates the operation, such as the memory allocating operation, it is enough for the signal processor 12 to only carry out the memory allocating operation according to the pattern information. Thus, the signal processor 12 can deal with the change in combination of the applications in real time.

Further, the CPU 11 can also accomplish easily and quickly a processing operation caused by the application change, only referring to the table 20 of the driver section 112 without accessing the signal processor 12 and executing calculation for the memory allocation.

Figure 2:
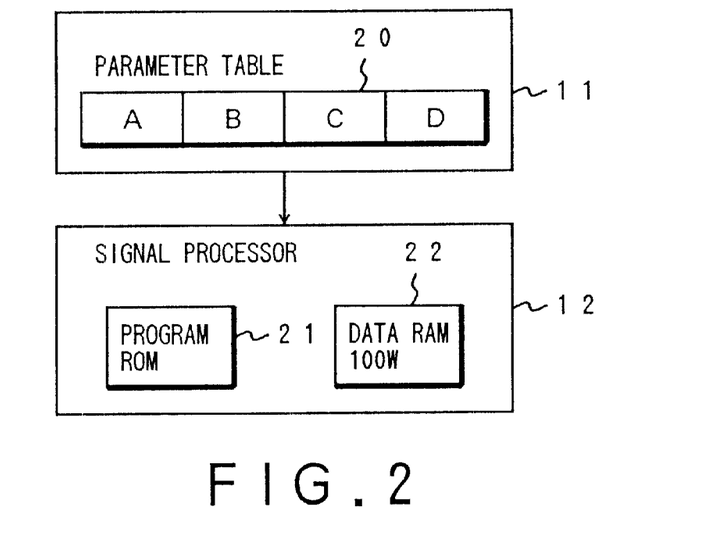
FIG. 2 is a block diagram for explaining a schematic structure of a signal processing system according to a preferred embodiment of the present invention.

Referring to FIG. 2, a signal processing system according to a preferred embodiment of the present invention comprises a CPU 11 in the form of a host computer, such as a personal computer or a microcomputer, and a signal processor 12, such as a DSP, to be controlled by the CPU 11. Like in FIG. 1, the CPU 11 is provided with a parameter table 20. On the other hand, the signal processor 12 is provided with a ROM 21 storing programs and a RAM 22 for storing data.

It is assumed that the shown signal processing system can use eight kinds of applications, that is, V.34 and V.32 for data modem, ADPCM and MPEG AUDIO for compression/decompression of audio data, PEQ and GEQ for audio equalizer, and MPEG and JPEG for image data compression/decompression. ADPCM is an abbreviation of Adaptive Differential Pulse Code Modulation. MPEG and JPEG are abbreviations of Moving Picture Experts Group and Joint Photographic Experts Group, respectively. Further, PEQ and GEQ are abbreviations of Parametric Equalizer and Graphic Equalizer, respectively. On the other hand, V.32 is an application for a modem of 9,600 bps, while V.34 is an application for a modem of 100,000 bps.

The foregoing eight kinds of the applications are often executed in a combined fashion according to a user's request. A user makes a variety of requests. Every time a change occurs in combination of the applications, the CPU 11 monitors the state of the signal processor 12 and carries out processes for the optimum scheduling, the optimum allocation on the data RAM 22 and so on. Since there so many combinations of the eight kinds of the applications, the foregoing processes depending on the requested combination applies heavy burden to the CPU 11.

On the other hand, the review of the foregoing eight kinds of the applications reveals that, for example, simultaneous execution of the application V.34 and V.32 is not practically possible, and ADPCM and MPEG AUDIO are not simultaneously executed. Further, it is not necessary to simultaneously execute PEQ and GEQ, which is also applied to JPEG and MPEG. Among the foregoing eight kinds of the applications, the application for modem, the application for audio data compression/decompression, the application for audio equalizer and the application for image data compression/decompression are often executed simultaneously in a combined fashion.

Figure 3:
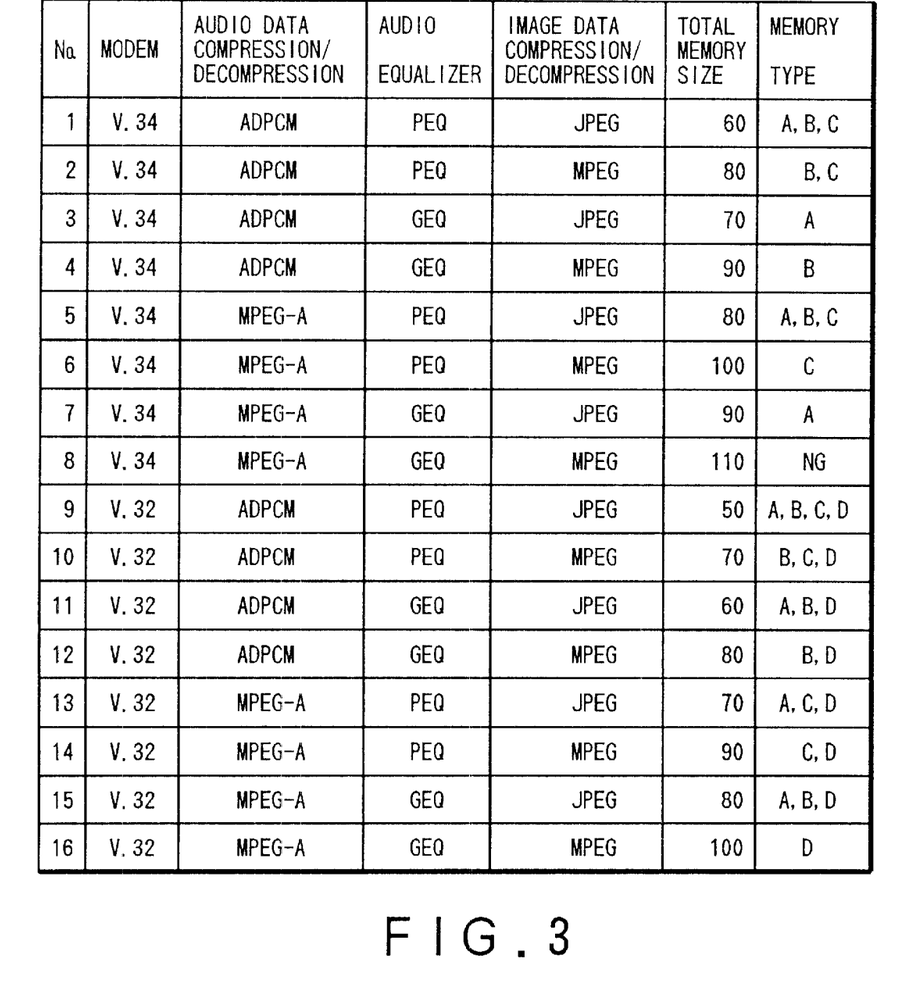
FIG. 3 is a diagram for explaining a relationship among application patterns each representing a combination of applications, memory sizes thereof and memory map patterns.

Considering the foregoing concurrency or simultaneous executability of the applications and further considering the maximum processing capability (MIPS) of the signal processor 12 and the data memory occupying sizes of the applications, the eight kinds of the applications are grouped into sixteen executable application patterns as shown in FIG. 3, wherein each application pattern includes four applications corresponding to modem, audio data compression/decompression, audio equalizer and image data compression/decompression (image code), respectively.

Referring to FIG. 3, the sixteen patterns are identified by Nos. 1 to 16. For facilitating explanation, it is assumed that the whole storage capacity of the data RAM 22 is 100. Then, the fifteen application patterns other than No. 8 are executable using the data RAM 22. Specifically, the total memory size of each of the fifteen application patterns other than No. 8 is within 100 so that data upon execution of these applications can be allocated on the data RAM 22. For example, the application pattern No. 1 is a combination of V.34, ADPCM, PEQ and JPEG so that the storage capacity necessary for the application pattern No. 1 is 60. Similarly, the application patterns Nos. 2 to 8 all use V.34 for modem and the total memory sizes thereof other than No. 8 are not greater than 100.

On the other hand, the application patterns Nos. 9 to 16 are patterns each determined by a combination of the applications using V.32 for modem. Since the total memory sizes for these application patterns are all not greater than 100, these application patterns can be allocated on the data RAM 22, respectively.

Figure 4:
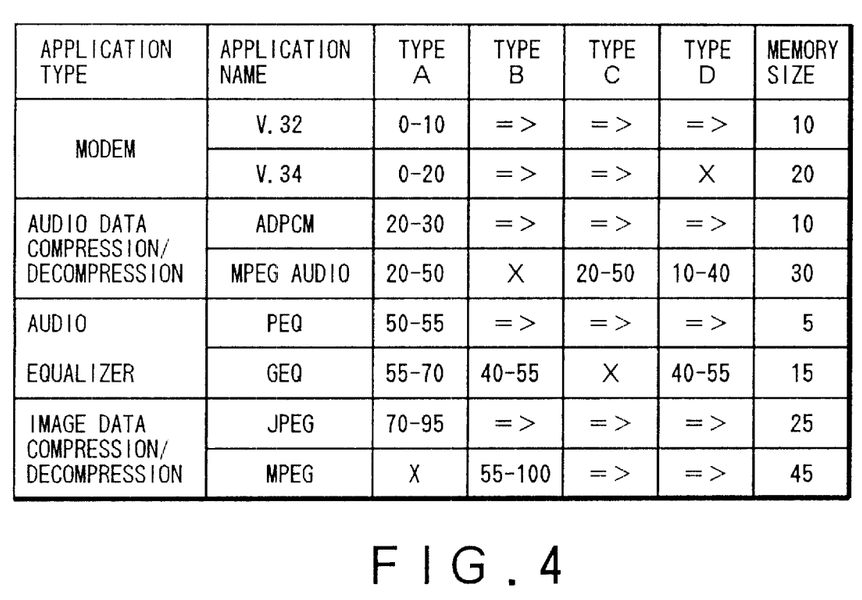
FIG. 4 is a diagram showing a relationship between a memory size required for each application and the memory map patterns.

Referring now to FIG. 4, there is shown a relationship between application names and memory sizes necessary therefor. From the figure, it is seen that the applications V.32 and V.34 require sizes of 10 and 20, respectively, so that V.34 uses more memory area as compared with V.32. Similarly, ADPCM and MPEG AUDIO require memory sizes of 10 and 30, respectively, and PEQ and GEQ require memory sizes of 5 and 15, respectively. Further, JPEG and MPEG require memory sizes of 25 and 45, respectively.

If the application pattern representing the combination of the larger memory size applications for modem, audio data compression/decompression, audio equalizer and image data compression/decompression can be allocated on the data RAM 22, all the application patterns can be dealt with by the single allocation method. However, like the application pattern No. 8, the combination of V.34, MPEG AUDIO, GEQ and MPEG requires the memory size exceeding 100 and thus can not be allocated on the data RAM 22.

Considering it, in FIG. 4, combinations each excluding one of the larger memory size applications are defined as types A to D. Specifically, the type A excludes MPEG, requiring the larger memory size, between the applications for image data compression/decompression, the type B excludes MPEG AUDIO between the applications for audio data compression/decompression. Similarly, the type C excludes GEQ between the applications for audio equalizer, and the type D excludes V.34 between the applications for modem.

In the signal processing system of this embodiment, as shown in FIG. 2, allocation patterns (memory map patterns) on the data RAM 22 are prestored on the parameter table 20 corresponding to the four types A to D. By only selecting one of the memory map patterns on the parameter table 20, the CPU 11 can determine allocation on the data RAM 22 in the signal processor 12. In other words, it is enough for the CPU 11 to select one of the memory map patterns upon every change of the application pattern, and thus it is not necessary to carry out calculation for an allocation pattern on the memory.

Figure 5:
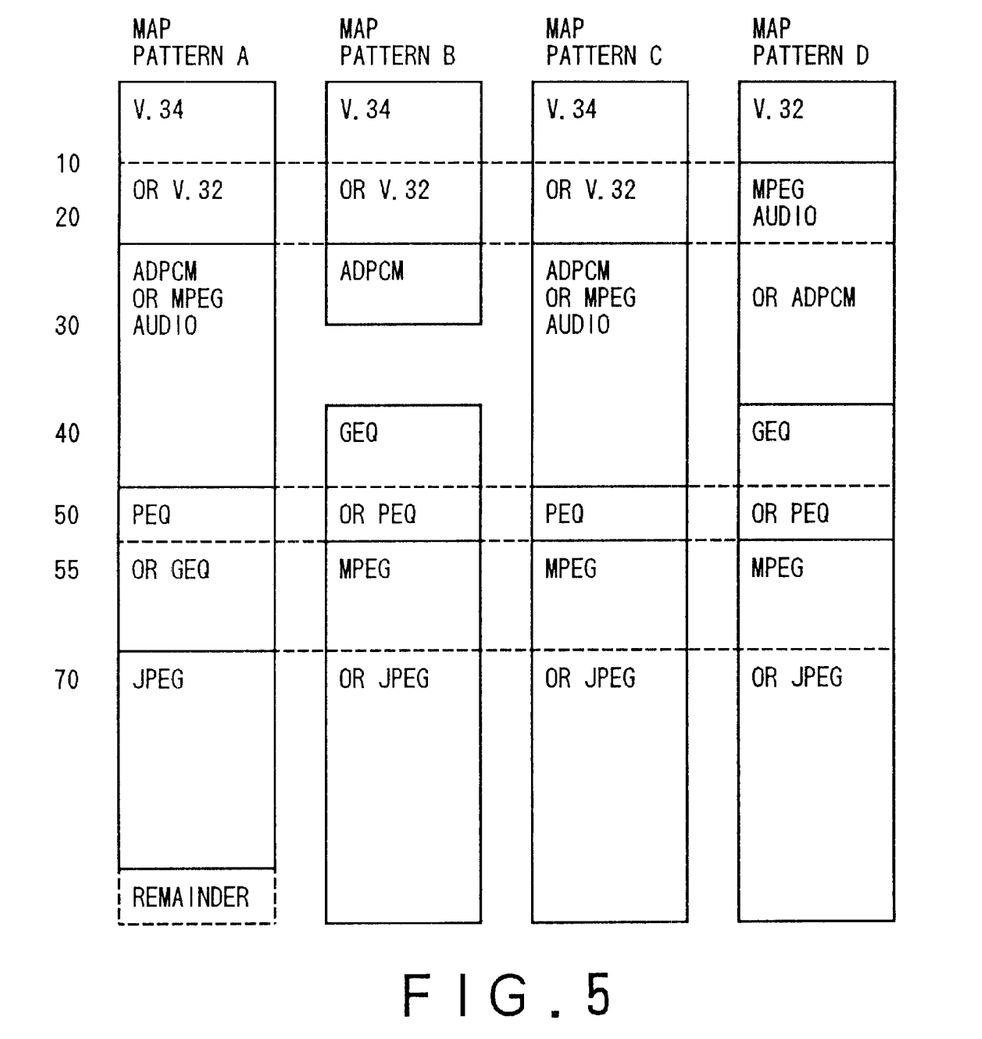
FIG. 5 is a diagram for explaining states of memory area allocation when the memory map patterns are mapped on a data RAM.

Referring to FIG. 5, the foregoing memory map patterns A to D corresponding to the types A to D are shown. In the memory map pattern A, area 0–20 is allocated to V.32 or V.34 for modem, and area 20–50 is allocated to ADPCM or MPEG AUDIO for audio data compression/decompression. Further, area 50–70 is allocated to PEQ or GEQ for audio equalizer, and area 70–95 is allocated to JPEG between the applications for image data compression/decompression, that is, no area for MPEG exists in the memory map pattern A.

On the other hand, in the memory map pattern B, no area for MPEG AUDIO is given, while area 20–30 is allocated to ADPCM. Further, area 40–55 is allocated to GEQ or PEQ, and area 55–100 is allocated to MPEG or JPEG. In the memory map pattern B, area 0–20 is allocated to V.32 or V.34 like in the memory map pattern A.

The memory map pattern C differs from the other memory map patterns A, B and D in that no area is allocated to GEQ. Specifically, in the memory map pattern C, area 0–20 is allocated to V.34 or V.32, area 20–50 is allocated to ADPCM or MPEG AUDIO, area 50–55 is allocated to PEQ, and the remaining area 55–100 is allocated to MPEG or JPEG.

The memory map pattern D differs from the other memory map patterns A, B and C in that no area for V.34 is given and area 0–10 is allocated to V.32 only. Following this, area 10–40 is allocated to MPEG AUDIO or ADPCM, area 40–55 is allocated to GEQ or PEQ, and area 55–100 is allocated to MPEG or JPEG.

As appreciated from the memory map patterns A, B, C and D, the areas for the applications other than MPEG AUDIO and GEQ are subjected to no change.

Referring back to FIG. 3, there is shown a relationship between the application patterns Nos. 1 to 16 and the foregoing memory map patterns A, B, C and D. For example, the application pattern No. 1 may be allocated an area of the data RAM 22 according to any of the memory map patterns A, B and C, while the application pattern No. 3 should be allocated a memory area according to only the memory map pattern A. Similarly, the application pattern No. 9 may be allocated a memory area according to any of the memory map patterns A, B, C and D. On the other hand, since the application pattern No. 8 can not be allocated an area of the data RAM 22, the memory type thereof is indicated as NG in FIG. 3.

Hereinbelow, a memory map pattern selecting operation in the CPU 11 will be described with reference to FIGS. 6 to 12.

Figure 6:
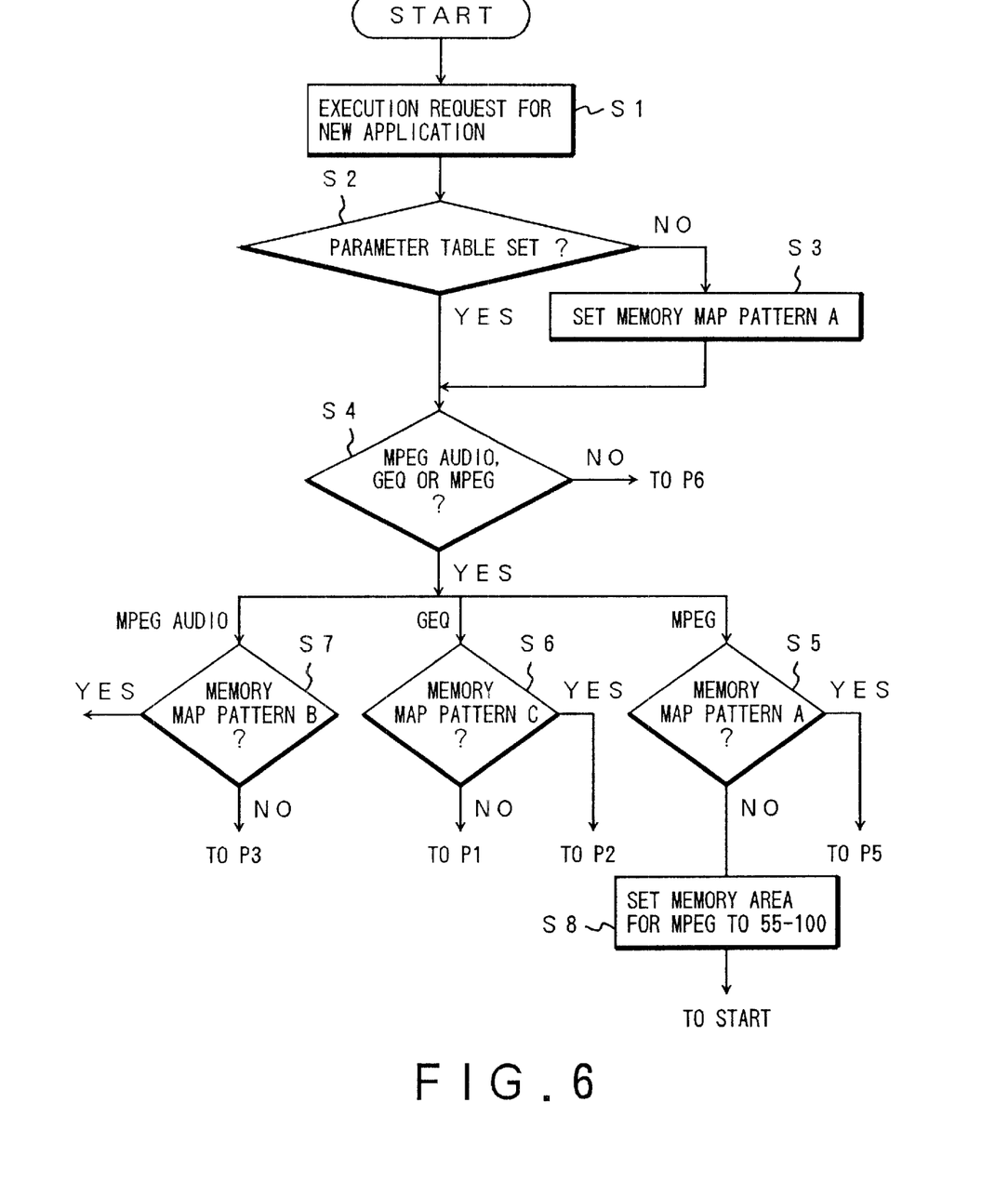
FIG. 6 is a flowchart for explaining a part of an operation of the signal processing system shown in FIG. 2.

As shown in FIG. 6, after the start of the selecting operation, when an execution request for a new application is made at step S1, that is, an entry request for a new application is made, the CPU 11 determines at step S2 whether a memory map pattern is set on the parameter table 20 shown in FIG. 2. If answer at step S2 is negative, the routine proceeds to step S3 where a default memory map pattern is set. Assuming that the memory map pattern A is set to be the default memory map pattern in this embodiment, the memory map pattern A is selected at step S3.

On the other hand, if answer at step S2 is positive, or if the memory map pattern A is designated at step S3, step S4 determines whether the new application is MPEG AUDIO, GEQ or MPEG. If the new application is MPEG, step S5 is executed. If the new application is GEQ, step S6 is executed. If the new application is MPEG AUDIO, step S7 is executed.

At step S5, it is determined whether the current pattern is the memory map pattern A which allocates no memory area to MPEG. If answer at step S5 is negative, the routine proceeds to step S8 where a memory area for MPEG is set to 55–100, and then returns to "Start".

On the other hand, if step S6 determines that the current pattern is not the memory map pattern C which allocates no memory area to GEQ, a first process P1 is executed for setting a memory area for GEQ to 55–70 or 40–55. On the other hand, if step S6 determines that the current pattern is the memory map pattern C, a second process P2 is executed for changing the memory map pattern.

On the other hand, if step S7 determines that the current pattern is not the memory map pattern B which allocates no memory area to MPEG AUDIO, a third process P3 is executed for setting a memory area for MPEG AUDIO to 10–40 or 20–50. On the other hand, if step S7 determines that the current pattern is the memory map pattern B, a fourth process P4 is executed for changing the memory map pattern.

On the other hand, if step S5 determines that the current pattern is the memory map pattern A, a fifth process P5 is executed for changing the memory map pattern.

On the other hand, if step S4 determines that the new application is not any of MPEG AUDIO, GEQ and MPEG, a sixth process P6 is executed.

Figure 7:
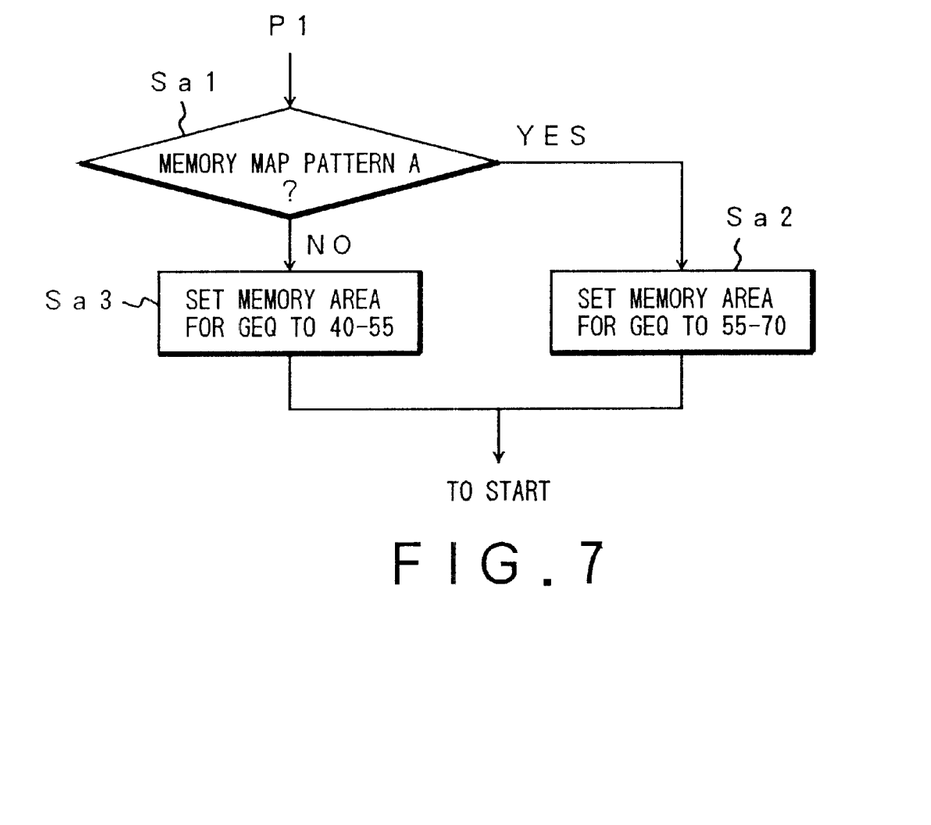
FIG. 7 is a flowchart for explaining a first process to be executed following the flowchart of FIG. 6.
Figure 8:
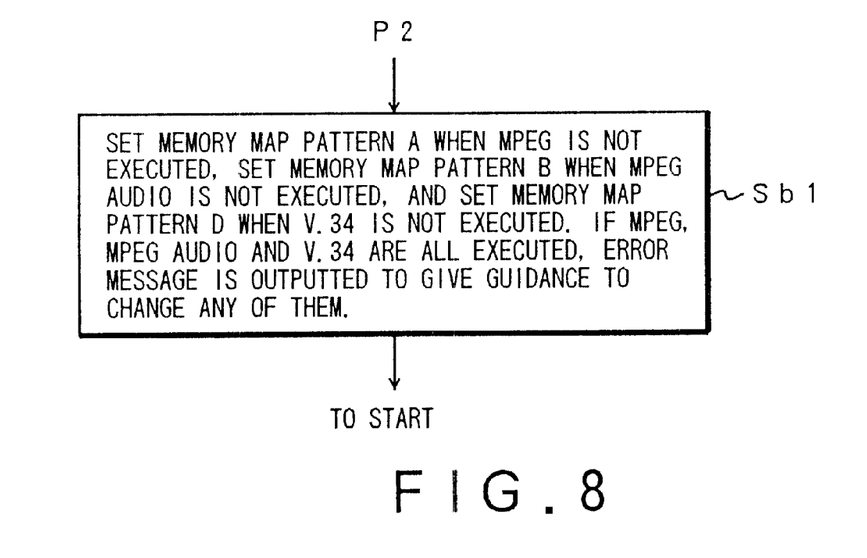
FIG. 8 is a flowchart for explaining a second process to be executed following the flowchart of FIG. 6.

Referring to FIGS. 7 and 8 along with FIG. 6, the first and second processes P1 and P2 relating to GEQ will be described.

If step S6 in FIG. 6 determines that the current pattern is not the memory map pattern C, step Sa1 in the first process P1 determines whether the current pattern is the memory map pattern A. If it is the memory map pattern A, a memory area of 55–70 is allocated to GEQ at step Sa2.

On the other hand, if step Sa1 determines that the current pattern is not the memory map pattern A, a memory area of 40–55 is allocated to GEQ at step Sa3.

On the other hand, if step S6 in FIG. 6 determines that the current pattern is the memory map pattern C, the second process P2 as shown in FIG. 8 is executed. Specifically, at step Sb1, the memory map pattern A is selected when MPEG is not executed, the memory map pattern B is selected when MPEG AUDIO is not executed, and the memory map pattern D is selected when V.34 is not executed. On the other hand, if MPEG, MPEG AUDIO and V.34 are all executed, the CPU 11 outputs an error message to notify a user of the execution not possible and give guidance to change any of MPEG, MPEG AUDIO and V.34.

Figure 9:
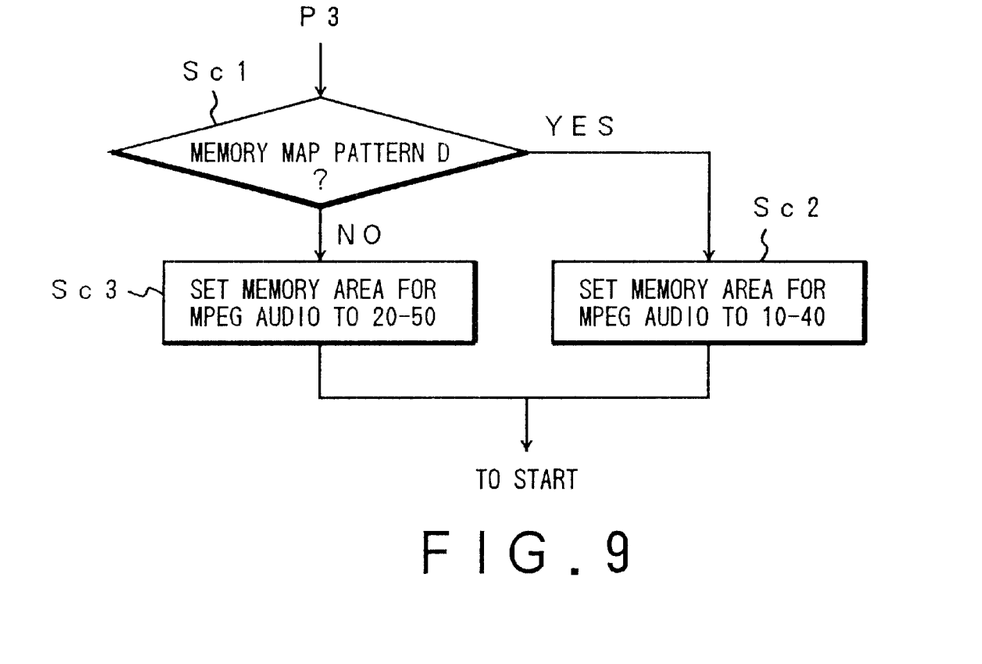
FIG. 9 is a flowchart for explaining a third process to be executed following the flowchart of FIG. 6.
Figure 10:
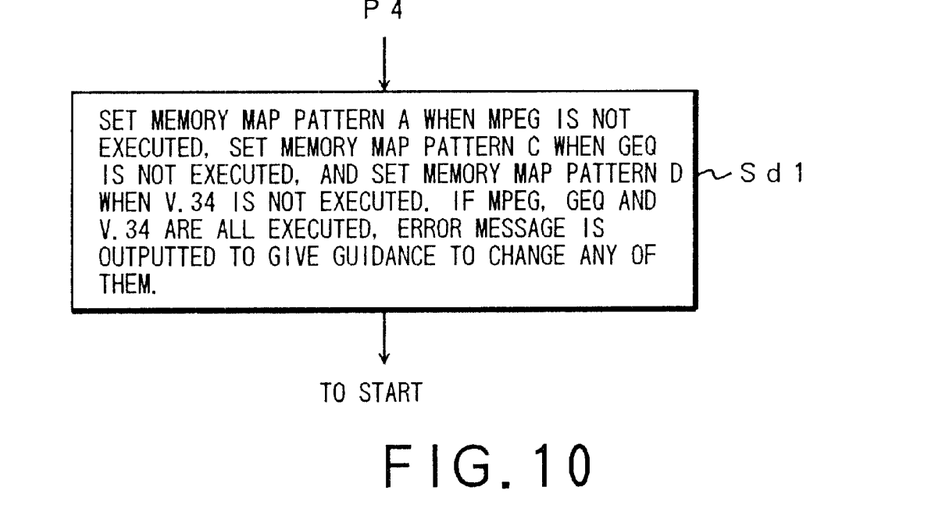
FIG. 10 is a flowchart for explaining a fourth process to be executed following the flowchart of FIG. 6.

Referring now to FIGS. 9 and 10 along with FIG. 6, the third and fourth processes P3 and P4 relating to MPEG AUDIO will be described.

If step S7 in FIG. 6 determines that the current pattern is not the memory map pattern B, step Sc1 of the third process P3 as shown in FIG. 9 is executed. At step Sc1, it is determined whether the current pattern is the memory map pattern D. If positive, the routine proceeds to step Sc2 where a memory area of 10–40 is allocated to MPEG AUDIO. On the other hand, if step Sc1 determines that the current pattern is not the memory map pattern D, a memory area of 20–50 is allocated to MPEG AUDIO.

On the other hand, if step S7 in FIG. 6 determines that the current pattern is the memory map pattern B, the fourth process P4 as shown in FIG. 10 is executed. Specifically, at step Sd1, the memory map pattern A is selected when MPEG is not executed, the memory map pattern C is selected when GEQ is not executed, and the memory map pattern D is selected when V.34 is not executed. On the other hand, if MPEG, GEQ and V.34 are all executed, the CPU 11 outputs, like in FIG. 8, an error message to notify a user of the execution not possible and give guidance to change any of MPEG, GEQ and V.34.

Figure 11:
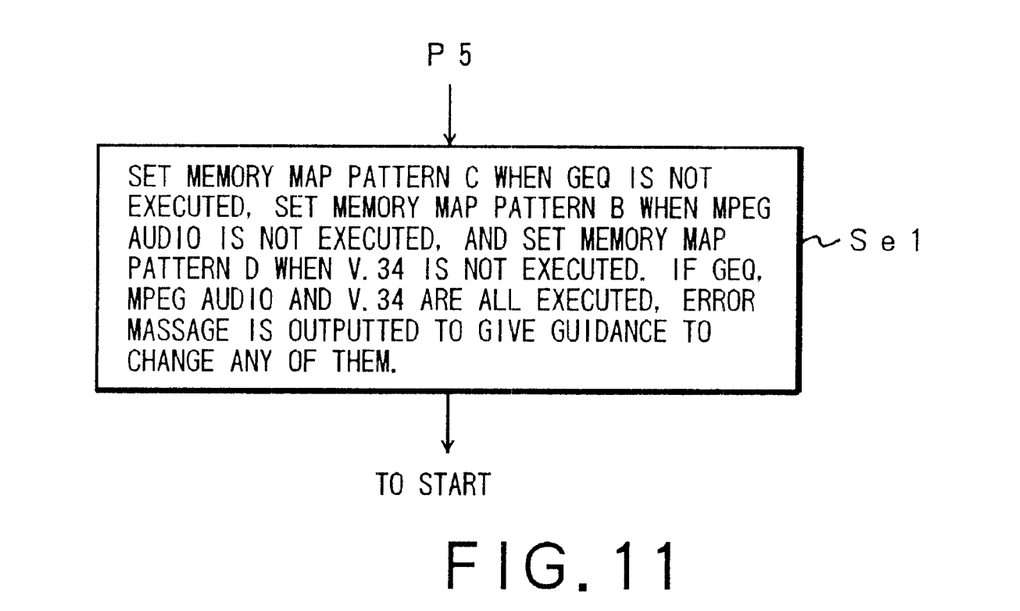
FIG. 11 is a flowchart for explaining a fifth process to be executed following the flowchart of FIG. 6.

Referring now to FIG. 11 along with FIG. 6, the fifth process P5 will be described. As appreciated, the fifth process P5 is executed when step S5 in FIG. 6 determines that the current pattern is the memory map pattern A. Specifically, as shown at step Se1 in FIG. 11, the memory map pattern C is selected when GEQ is not executed, the memory map pattern B is selected when MPEG AUDIO is not executed, and the memory map pattern D is selected when V.34 is not executed. On the other hand, if MPEG, MPEG AUDIO and V.34 are all executed, the CPU 11 outputs, like in FIG. 8 or 10, an error message to notify a user of the execution not possible and give guidance to change any of MPEG, MPEG AUDIO and V.34.

Figure 12:
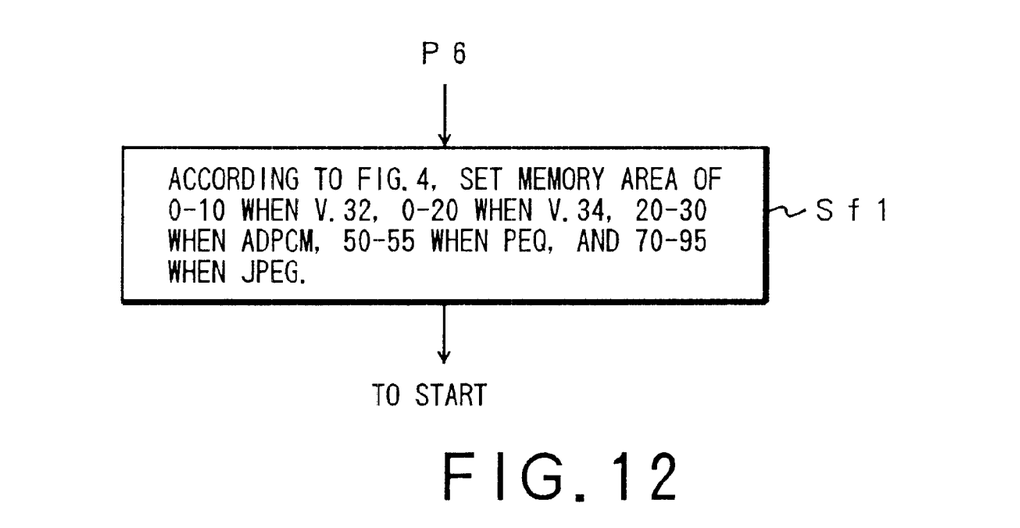
FIG. 12 is a flowchart for explaining a sixth process to be executed following the flowchart of FIG. 6.

Referring now to FIG. 12 along with FIG. 6, the sixth process P6 will be described. The sixth process P6 is executed when step S4 in FIG. 6 determines that the new application is none of MPEG AUDIO, GEQ and MPEG. In the sixth process P6, a memory area for the new application is set according to FIG. 4. Specifically, as shown at step Sf1 in FIG. 12, a memory area of 0–10 is allocated to the new application when it is V.32, a memory area of 0–20 is allocated thereto when it is V.34, a memory area of 20–30 is allocated thereto when it is ADPCM, a memory area of 50–55 is allocated thereto when it is PEQ, and a memory area of 70–95 is allocated thereto when it is JPEG.

As described above, the memory map patterns corresponding to the application patterns which change upon the entry or the de-entry of the application are stored on the parameter table in the CPU or the signal processor. Since the memory area can be allocated to each of the applications according to the memory map pattern, it is not necessary for the CPU to carry out the calculation of the memory areas etc. following the application change. Thus, the burden applied to the CPU can be largely reduced.

While the present invention has thus far been described in conjunction with a preferred embodiment thereof, it will readily be possible for those skilled in the art to put this invention into practice in various other manners. For example, although the combinations of the applications are determined in consideration of the memory sizes required for the respective applications in the foregoing description, the combinations of the applications may be determined based on the maximum processing capability of the signal processor 12. Further, in FIG. 2, the parameter table 20 is provided in the CPU 11. However, the parameter table 20 may be provided in the signal processor 12.

What is claimed is:

1. A signal processing system for simultaneously executing a combination of applications, comprising:
   a table storing a plurality of predetermined memory allocations, each predetermined memory allocation corresponding to one or more combinations of applications that may be executed concurrently by the signal processing system, each of the respective memory allocations comprising a memory map indicating storage areas assigned to each application of the combination to prevent the combination of applications from exceeding a memory capacity of the system;

obtaining means for determining, upon receipt of a request for entry or de-entry of an application, whether a current memory allocation is applicable to a new combination of applications resulting from said requested entry or de-entry, and if said current memory allocation is not applicable, obtaining from the table memory allocation that is applicable to said new combination of applications; and executing means for executing said new combination of applications in accordance with the memory allocation obtained by said obtaining means.

2. A signal processing system as claimed in claim 1, wherein a memory allocation stored in said table corresponds to multiple combinations of applications that may be executed concurrently by the signal processing system.

3. A signal processing system as claimed in claim 1, wherein said combinations comprise combinations of applications that are simultaneously executable.

4. A signal processing system as claimed in claim 1, further comprising:

a central processing unit; and a signal processor for executing signal processing under control of said central processing unit, said signal processor including a data memory, wherein said data memory is organized into said storage areas in accordance with a memory allocation corresponding to said combination of applications currently being executed.

5. A signal processing system as claimed in claim 4, wherein said memory allocation defines a size of each of said storage areas.

6. A signal processing system as claimed in claim 4, wherein each of said memory map patterns is determined so as not to exceed a storage capacity of said data memory.

7. A signal processing system as claimed in claim 4, further comprising means for producing an error message when said new combination of applications will exceed a storage capacity of said data memory.

8. A signal processing system as claimed in claim 1, further comprising:

a central processing unit; and a signal processor for executing signal processing under control of said central processing unit, said table being provided in said central processing unit.

9. A signal processing system as claimed in claim 1, further comprising:

a central processing unit; and a signal processor for executing signal processing under control of said central processing unit, said table being provided in said signal processor.

10. A signal processing system as claimed in claim 1, wherein, when said current memory allocation is applicable to said new combination of applications, said execution means executes said new combination of applications using said current memory allocation.

11. A signal processing method in a signal processing system for simultaneously executing a combination of applications, comprising the steps of:

storing, in a table, a plurality of predetermined memory allocations, each of said predetermined memory allocations corresponding to one or more combinations of applications that may be executed concurrently by the signal processing system, each of the respective memory allocations comprising a memory map indicating storage areas assigned to each application of the combination to prevent the combination of applications from exceeding a memory capacity of the system;

determining, upon receipt of a request for entry or de-entry of an application, whether a current memory allocation is applicable to a new combination of applications resulting from said entry or de-entry;

if said current memory allocation is not applicable, obtaining from the table a memory allocation that is applicable to said new combination of applications and executing said new combination of applications in accordance with the obtained memory allocation.

12. A signal processing method as claimed in claim 11, wherein a memory allocation stored in said table corresponds to multiple combinations of applications that may be executed concurrently by the signal processing system.

13. A signal processing method as claimed in claim 11, wherein said combinations of applications are combinations that are simultaneously executable.

14. A signal processing method as claimed in claim 11, wherein a memory allocation defines sizes of said storage areas in a data memory corresponding to applications of said combination of applications to be executed simultaneously.

* * * * *